United States Patent [19]

Krühn

[11] 3,744,736

[45] July 10, 1973

[54] RECORDING AND/OR PLAYBACK DEVICE HAVING TAPE-TYPE RECORD CARRIERS WHICH ARE WOUND ON A REEL

[75] Inventor: Jürgen Krühn, Konstanz, Germany

[73] Assignee: Licentia Patent-Verwaltungs-G.m.b.H., Frankfurt am Main, Germany

[22] Filed: June 28, 1971

[21] Appl. No.: 157,371

[30] Foreign Application Priority Data

June 29, 1970 Germany.................. P 70 24 281.8

[52] U.S. Cl. ................. 242/195, 206/52 F, 206/53, 242/210

[51] Int. Cl. ........................ G03b 1/04, G11b 15/32

[58] Field of Search .......242/192-199, 210, 71.8 A; 274/4 R-4 C, 11 R, 11 C, 11 F; 29/430; 206/52 F, 53; 117/76

[56] References Cited

UNITED STATES PATENTS

| | | | |
|---|---|---|---|
| 2,141,109 | 12/1938 | Kemptgen | 206/53 |
| 2,894,620 | 7/1959 | Campbell, Jr. | 206/53 |
| 3,030,231 | 4/1962 | Bar | 117/76 |
| 3,677,495 | 7/1972 | Villers et al. | 242/197 |
| 3,006,650 | 10/1961 | Ellmore | 174/4 C |
| 3,090,574 | 5/1963 | Doncaster et al | 242/195 |
| 3,150,840 | 9/1964 | Briskin et al | 242/195 |
| 3,325,889 | 6/1967 | Meli et al | 29/430 |

*Primary Examiner*—Leonard D. Christian
*Attorney*—Spencer & Kaye

[57] ABSTRACT

A system including a tape reel containing a length of tape whose leading end can be fed out of the reel by rotation of the reel and a recording and/or playback instrument for guiding the leading end onto a takeup reel, the tape having a stiff, resilient leader tape arranged to bear against peripheral surfaces of the reel flange, the surfaces being inset radially from the outer flange extremity, and at least part of the leader tape having a normal curvature such that it presses against the peripheral surfaces.

13 Claims, 20 Drawing Figures

Inventor:
Jürgen Krühn

BY Spencer & Kaye
ATTORNEYS.

Inventor:
Jürgen Krühn

BY Spencer & Kaye
ATTORNEYS.

Inventor:
Jürgen Krühn
BY Spencer & Kaye
ATTORNEYS.

Inventor:
Jürgen Krühn
BY Spencer & Kaye
ATTORNEYS.

RECORDING AND/OR PLAYBACK DEVICE HAVING TAPE-TYPE RECORD CARRIERS WHICH ARE WOUND ON A REEL

BACKGROUND OF THE INVENTION

The present invention relates to tape recording/-playback instruments using tape reels, and particularly to systems for automatically threading a tape along its intended travel path and onto the instrument takeup reel.

Many arrangements of this type have already been proposed. For example, German Pat. No. 1,249,927 discloses a cartridge containing a tape-type recording carrier which is wound on a reel, the carrier having its trailing end fastened to the core, or axle, of the reel and its beginning, or leading end, provided with a stiff leader tape which can be wound on the peripheral edges of the reel flange. The leader tape can be pushed out of the cartridge through a slit therein by a driving force acting in the unwinding direction and can then be pushed along a guide path of a recording and/or playback instrument in the direction toward its takeup device.

The case of the known cartridge has a cutout which exposes a section of the reel flange and of the leader tape. To start the advance of such a carrier, a drive roller from the recording and playback instrument extends into this cutout from the outside and exerts a frictional force on the leader tape in the unwinding direction so that it is pushed through a slit in the cartridge along a cylindrical guide sleeve in the case.

SUMMARY OF THE INVENTION

It is an object of the present invention to improve a device of the above-mentioned type by simplifying its structure while maintaining the dust-tight storage of the recording carrier, which simplications result in substantial savings.

According to one feature contributing to the achievement of this object in recording and/or playback devices according to the invention, the peripheral edges against which the leader tape bears are formed as an annular stage, or step, disposed on the inside of the reel flange and the leader tape consists of a resilient material and is provided, except for a short leading portion, with such a curvature that it encloses, and presses against, the peripheral edges under its own tension. Even if such a reel is disposed in a cartridge, this offers the advantage that the reel is inherently sealed in a dustfree manner by the leader tape which encloses the reel not loosely but tightly due to the tension which it experiences. Dust entering into the cartridge through the slit or the above-mentioned cutout in the cartridge can thus not deposit itself on the record carrier. Undesirable loosening of the turns of the leader tape and particularly of the record carrier is substantially eliminated. Finally, the normal curvature of the leader tape also facilitates the automatic threading of the leading end of the leader tape in the gripping range of the takeup device since such a leader has a natural tendency to wrap around the takeup spindle, or core.

According to a further particularly favorable feature of the invention, the storage container for the record carrier is provided by the reel itself, which is closed off by the leader tape. Because of the dust-tight seal by the leader tape with its impressed curvature, which also causes the leader to be sufficiently secured mechanically, the reel acts as a special closed cartridge holding the wound record carrier.

Within the scope of the device according to the present invention a friction wheel may be provided, as disclosed in German Pat. No. 1,249,927 and arranged to be pressed against the leader tape and the peripheral flange edges during the starting phase and driven in such a manner that it exerts a driving force in the unwinding direction.

Another possibility according to a further embodiment of the present invention is that during the starting phase the reel itself is driven in the unwinding direction by the takeup hub of the recording and/or playback device and the surface of at least the peripheral edges of the reel flange is so designed that a sufficient unwinding force becomes effective between those peripheral edges and the leader tape.

DESCRIPTION OF THE PREFERRED EMBODIMENTS

Although the embodiments described below relate to reels as well as recording and/or playback instruments for magnetic tapes, the present invention is not limited to a particular species of tape-type recording instruments.

Figures 1, 2, 3, 4, 5, 6, 7:
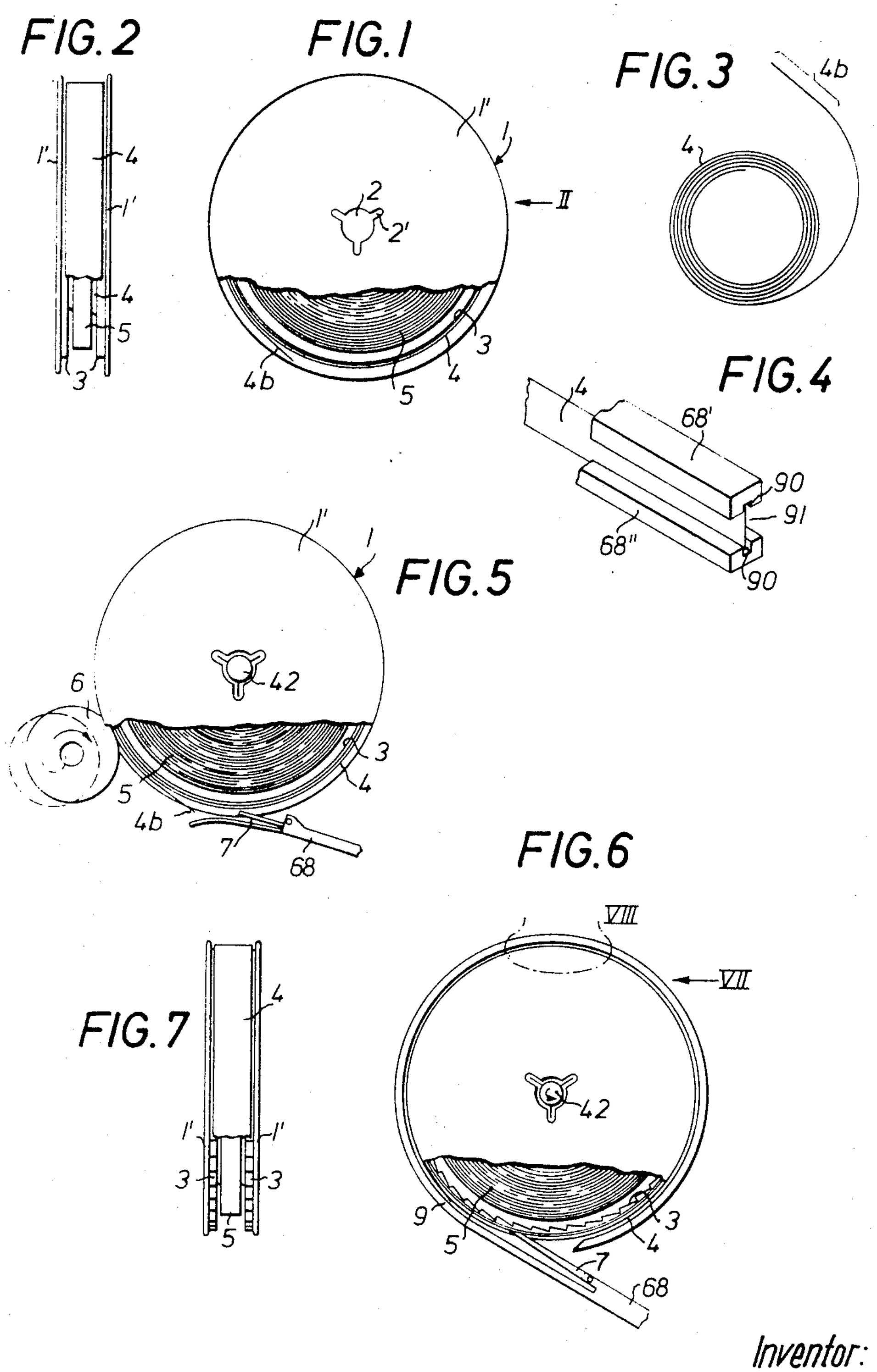
FIG. 1 is an axial view of a reel provided with a magnetic tape and leader tape, a part of the upper reel flange being cut away.
FIG. 2 is a view of the reel of FIG. 1 in the direction of arrow II of FIG. 1, with a part of the leader tape cut away.
FIG. 3 is an axial view of the leader tape by itself in its normal, or unstressed state.
FIG. 4 is a perspective view of a guide path for the leader tape.
FIG. 5 is a view similar to that of FIG. 1 showing the same reel during the starting phase of tape feed and including the adjacent components of an associated magnetic tape recorder.
FIG. 6 is a view similar to that of FIG. 1 of a further embodiment of a reel according to the invention during the starting phase of tape feed and including the adjacent components of the magnetic tape recorder.
FIG. 7 is a view of the reel of FIG. 6 in the direction of the arrow VII of FIG. 6, with a part of the leader tape cut away.
Figure 8:
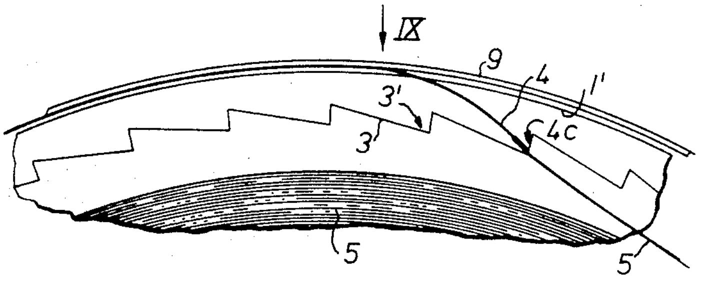
FIG. 8 is an enlarged detail view of the portion of the unit of FIG. 7 enclosed by line VIII, the upper reel flange removed.
Figure 9:
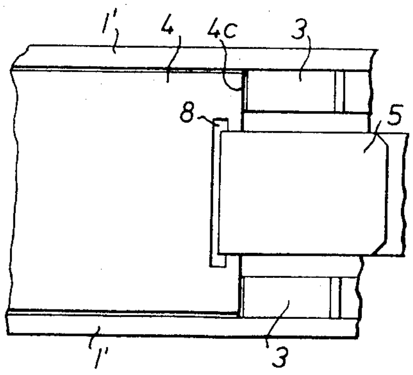
FIG. 9 is a detail view of the reel portion of FIG. 8 taken in the direction of arrow IX of FIG. 8.
Figure 12:
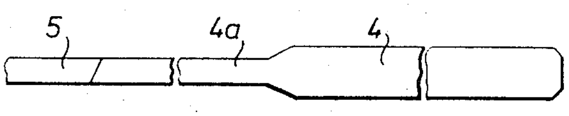
FIG. 12 is a plan view of a first embodiment of a leader tape according to the invention.

The reel 1 shown in FIGS. 1 and 2 is provided for a magnetic tape and includes, as is common, a takeup bore 2 around whose periphery three follower grooves 2′ are provided. The sides of the reel are constituted by reel flanges 1′ each provided interiorly with a concentrically disposed annular step, the peripheral edges 3 of these steps bearing the leader tape 4. Leader tape 4 is wider than the magnetic tape 5. At the junction with the magnetic tape 5, the leader tape may be provided, as shown in FIG. 12, with a section 4*a* which has the same width as the magnetic tape.

The leader tape 4, except for a short leading portion 4*b*, is provided with an inherent curvature of such a radius that the leader is expanded from its normal curvature when around edges 3 and thus tightly encloses, and grips, the peripheral edges 3 of reel 1. The starting portion 4*b* has a lesser normal curvature, or none at all, so that a space is established, between the leading edge, i.e., the front edge of portion 4*b*, of the leader tape and the next turn of the wound leader tape, which permits easy removal of the leader tape, for example, by means of a properly positioned thin tongue, when the reel or tape is driven in the unwinding direction.

FIG. 3, which is to the same scale as FIGS. 1 and 2, shows one embodiment of a leader tape 4 in its normally curved, or unstressed, state. In accordance with one advantageous arrangement, the curvature of the leader tape may approach that of reel flange edges 3 at the leading end of tape 4.

The leader tape 4 consists of an elastic, resilient material which tends to retain as much as possible the curvature imparted to it. This may be a metal, as for example bronze, or a suitable plastic material.

The following description relates to a recording and/or playback device, specifically a magnetic tape recorder, in which such a reel as illustrated in FIGS. 1–2 directly serves as the storage container for the record carrier, i.e., without an additional cartridge holding the reel.

In FIG. 5 a reel 1 of the type illustrated in FIGS. 1, 2 and 3 is place on the takeup hub 42 of a magnetic tape recorder. The recorder is also provided with a friction wheel 6 which is urged during the starting phase of tape feed against the leader tape 4 in a known manner and is driven in such a manner that it exerts an advancing force on the leader tape in the unwinding direction, as indicated by the arrow on element 6. In the course of the resulting rotational movement of reel 1, the leading edge of the leading portion 4*b* of the leader tape reaches the vicinity of a resiliently mounted tongue 7. This tongue lifts the leader tape away from the reel and slides it into the guide path 68 of the magnetic tape recorder. During insertion and removal of the reel 1, means are provided for moving friction wheel 6 and tongue 7 outside of the area enclosed by the circumference of reel flange 1′.

An advantageous possibility for the design of the guide path 68 of the leader tape 4 can be seen in FIG. 4 which shows the guide path to consist of two laterally spaced guide bars 68′ and 68″. Each bar is provided with a groove 90 through which a respective lateral edge of the leader tape passes. The opening 91 defined between the two guide bars at the side of the tape facing the magnetic heads is wider than tape 5 and thus wide enough to permit the magnetic tape 5 which follows the leader tape to pass through this opening.

As mentioned above, it is also possible to drive the leader tape 4 during the starting phase of tape feed by driving the reel 1 directly by the takeup hub 42. At least the surfaces of the peripheral edges 3, and under certain circumstances also the surface of the leader tape 4, is then so designed as to create a sufficient takeup force between the peripheral edges and the leader tape. Different possibilities exist for the design of the above-mentioned surfaces, and several of these will be described below.

In the embodiment shown in FIGS. 6 to 9 no special measures are applied to the leader tape 4 itself. However, the peripheral edges 3 of the reel 1 are provided with recesses 3′, shown in FIG. 8, against which the rearward edge 4*c* of the leader tape, i.e., the edge adjoining magnetic tape 5, is supported during the starting phase. These recesses are formed by giving peripheral edges 3 a sawtooth profile. The junction between leader tape 4 and magnetic tape 5 is constituted by a loop formed by the end of tape 5 and a slit 8 of the leader tape 4 through which the loop passes. The free end of the loop is attached, as by cementing, to its adjacent portion of tape 5. However, the connection between leader tape and magnetic tape could also be designed in a manner similar to that shown in FIG. 12, except that the junction between the wide portion of the leader tape 4 and its narrower portion 4a would have to form a right angle rather than a tapered edge.

In the embodiment of FIGS. 6–9 the unwinding, or forward feed, force is imparted only to the rearward edge of the leader tape 4 and the transmission of force takes place only within the leader tape, i.e., along a spiral path, up to its leading edge. As soon as a resistance to movement is experienced by the leader tape during advance movement, the layers of the wound leader tape tend to expand. Therefore a guide surface 9 is provided on the magnetic tape recorder to concentrically enclose the reel, or the wound leader tape. Surface 9 has as low a friction effect as possible and leads into the guide path 68.

Figure 11:
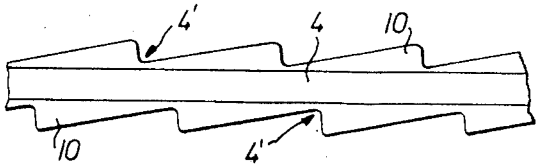
FIG. 11 is a developed view to an enlarged scale, of a portion of a leader tape used in the embodiment of FIG. 10.
Figure 10:
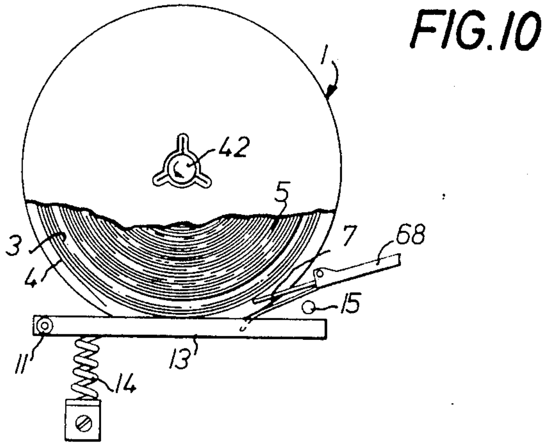
FIG. 10 is a view similar to that of FIG. 6 of another embodiment of the invention, during the starting phase of tape feed.
Figure 15:
FIG. 15 is a side view to an enlarged scale of a section of the leader tape of FIG. 14.
Figure 14:
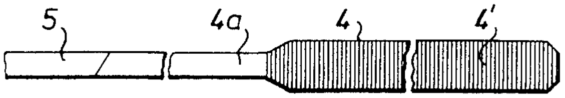
FIG. 14 is a view similar to that of FIG. 12 of a third embodiment of the leader tape.

FIGS. 10, 11, 14 and 15 relate to an embodiment of the invention in which the upper side and the underside, i.e., both wide surfaces, of the leader tape, as well as the peripheral edges 3 of the reel which bear the leader tape, are provided with transverse grooves. In FIGS. 14 and 15 the sawtooth-type transverse grooves 4′ are formed by an appropriate shaping of the tape material. FIG. 11 shows another possibility in which a leader tape 4, made for example of bronze, is provided with a profiled plastic coating 10 on both wide surfaces. The peripheral edges 3 of reel 1, which are shown in FIG. 10 in dot-dash lines, have a similar, and thus mating, profile.

In this embodiment one or a plurality of compression elements are required to press the leader tape 4 during the starting phase of tape feed against the peripheral edges 3 which it encloses. In the embodiment of FIG. 10, there is provided a pressure arm 13 which is mounted on a shaft 11 and which is urged toward an abutment 15 by a spring 14. Contrary to the situation occurring in the operation of the embodiment of FIGS. 6 to 9, here the outer layer of the leader tape 4 is carried along at that point where the pressure element 13 is effective. The transfer of force at this point is in a radial direction from the peripheral edge 3 through the individual layers of the leader tape up to the outer layer. So even without a guide surface enclosing the reel, a function-impairing expanding of the wound leader tape can here not occur.

Figure 13:
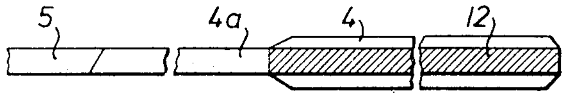
FIG. 13 is a view similar to that of FIG. 12 of a second embodiment of the leader tape.

Instead of the transverse grooves, the peripheral edges of the reel which support the leader tape may also be provided with a coating having a high coefficient of friction. Advisably, as shown in FIG. 13, at least one side of the leader tape 4 is then also provided with a coating 12 having a high coefficient of friction, but only in its center zone, so that it can continue to slide without friction in the guide path 68 shown in FIG. 4. The starting phase of the feed of this tape corresponds to that described with reference to FIG. 10.

For a recording and/or playback device to be suited for use with reels of the above-mentioned type, particularly for reels having the special features of the present invention, it must be provided with special components. These will be described below with reference to FIGS. 16, 17 and 20 which illustrate one embodiment of a magnetic tape recorder.

The individual operating components of the magnetic tape recorder are fastened to, and extend below, a base plate 40. The reel 1 is placed onto the takeup hub 42, this being accomplished by manually or automatically pivoting tongue 7 and contact arm 13 out of the way. The takeup hub 42 for the reel is seated on the shaft of the left-hand winding motor 43.

The right-hand winding motor 44 is provided with a takeup core 45 whose jacket surface has a high coefficient of friction. In a known manner, as disclosed for example in German Published Patent Application No. 1,156,439, the takeup device contains two guide bars 48 and 49 which conform to the circumference of the takeup core 45 and which are pivotal about axes 46 and 47, respectively, fixed to base plate 40. The guide bars are connected to a slide 52 by means of joints 50 and 51, respectively. This slide is displaceably mounted on bolts 55 and 56 by means of two slits 53 and 54. The slide may be brought from its rest position in the direction of the arrow into the illustrated position by means of a pulling magnet 57 against the action of a tension spring 58. In this position the guide bars 48 and 49 which were moved along with the slide are pivoted toward the takeup core 45 and are in light contact therewith. This position corresponds to the starting phase of the instrument. In the rest position the guide bar 49 takes up the position shown in dashed lines and the guide bar 48 has a corresponding position.

The magnetic tape recorder is provided with a combined recording and playback head 59, an erasing head 60 and guide pins 61. The capstan 62 is formed by the shaft of a motor 63. Moreover, a pressure roller 64 is provided which cooperates with the capstan and which is mounted on a lever 65 so that it can be brought into the operating position by a pulling magnet 66 against the opposition of a tension spring 67. Lever 65 is pivoted to base plate 40 at the point where its two arms meet.

A guide path 68, which is illustrated only schematically, extends from the reel 1 to takeup core 45. Guide path 68 is fastened to supports 68'''. The guide path serves to guide the leader tape 4, which is pushed out of the reel during the starting process, past heads 59, 60 and pins 61 into the gripping region of the takeup core 45. It may be desirable under certain circumstances to provide a separate covering wall for the above-mentioned components which are disposed on the left-hand side of the guide path with respect to the view of FIG. 16, which wall is moved out of the tape plane during the recording or playback operations, in a direction either toward the top of toward the bottom.

Figure 20:
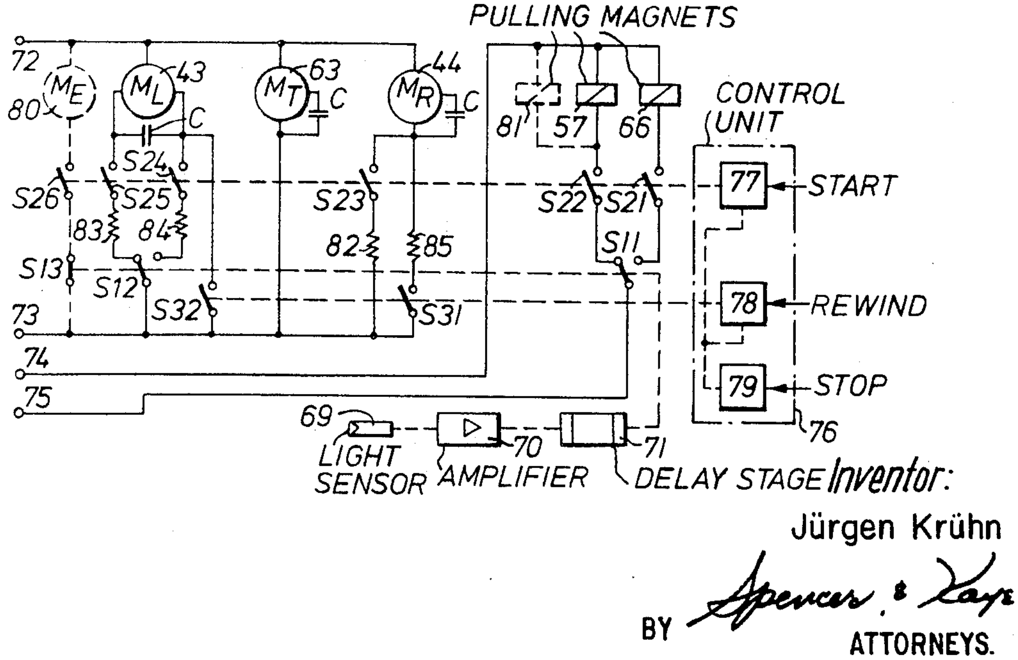
FIG. 20 is a simplified schematic representation of the electrical control of a magnetic tape recorder of FIGS. 16 and 17 or FIGS. 18 and 19.

In the vicinity of the takeup core 45, a light barrier composed of a light source 69' and a light sensor 69 is disposed in the path of the tape and arranged to emit a signal when the light beam is interrupted by the leader tape 4 of the magnetic tape 5. As shown in FIG. 20, the signal from the light-sensitive member 69 is fed through an amplifier 70 to a delay stage 71 which effects a delay of approximately half a second Thereafter it effects, via simple switching means (not shown), actuation of switches S11 and S12. This switching means could, for example, be constituted by a relay.

FIG. 20 is a simplified circuit diagram illustrating the control of the operational steps of such a magnetic tape recorder. This diagram shows the left-hand winding motor 43, the right-hand winding motor 44 and the motor 63 bearing the capstan connected between the terminals 72 and 73 of the a.c. power source via various switches and resistors. A phase shift capacitor C is associated with each motor.

Figure 16:
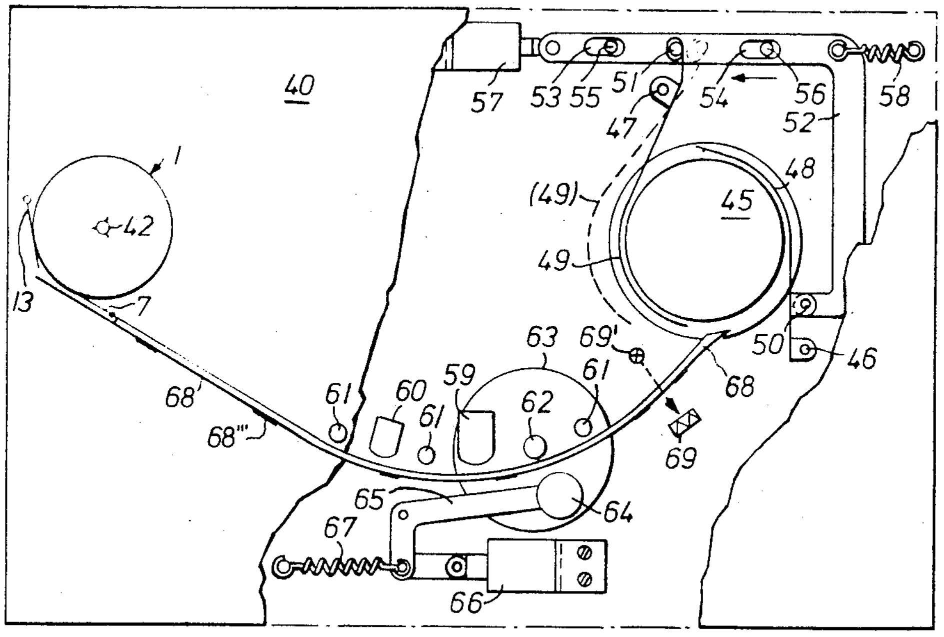
FIG. 16 is a plan view of a first embodiment of a magnetic tape recorder according to the invention, for utilizing a cartridge according to the invention, the base plate of the recorder being partially cut away.

Motor 43 may be switched to rotate, with respect to the view of FIG. 16, clockwise for rewinding, or counterclockwise for feeding out the leader tape, depending on which side of its capacitor C is connected with terminal 73. The voltage supply terminals 74 and 75 can be connected, via various switches, to pulling magnets 57 and 66.

Depressing a START key closes switches S21, S22, S23, S24 and S25 via a control unit 76 and depressing a STOP key causes them to open again. Depressing a REWIND key actuates switches S31 and S32 via the control unit. These switches are also returned to their rest positions by depressing the STOP key, for example. Switching stages 77, 78 and 79 are provided for linking, in a known manner employed in studio tape recorders, the different control orders according to the operating state of the instrument and different conditions serving to maintain operational safety. These stages may be connected together either electrically or mechanically.

Figure 17:
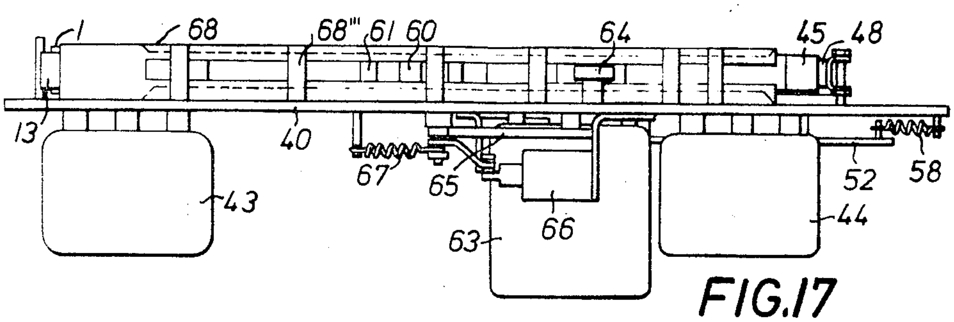
FIG. 17 is a frontal elevational view of the magnetic tape recorder of FIG. 16.

The switches S13 and S26, motor 80 and pulling magnet 81 shown in FIG. 20 do not form a part of the embodiment of FIGS. 16–17. They relate to a further embodiment of the tape recorder which will be discussed in connection with FIGS. 18 and 19.

The tape recorder of FIGS. 16, 17 and 20 can be placed in the following operational states:

Upon switching on the instrument, by connecting terminals 72 and 73 to an a.c. power supply, the capstan motor 63 starts up. All of the switches are in the position illustrated in FIG. 20. It is assumed that a reel 1 of the type shown in FIGS. 10 and 11 has been placed onto the takeup hub 42. If now switches S21 to S25 are closed due to the depression of the START key, pulling magnet 57 is excited via switches S11 and S22 so that guide bars 48 and 49 are pivoted toward takeup core 45 as shown in solid lines in FIG. 16. At the same time, the right-hand winding motor 44 starts up since it is supplied with power via resistor 82 and switch S23. Furthermore, switch S12 connects terminal 73 to resistor 83 and switch S25 connects resistor 83 to the left-hand winding motor 43 to rotate counterclockwise.

The left-hand winding motor 43 now drives the reel 1, via the takeup hub 42, in the unwinding direction. Because, during this rotation, arm 13 urges leader tape 4 against the edges 3 of the reel flange to cause the edges to apply a driving force to the leader tape, this tape is lifted off the reel by tongue 7 and is then pushed along guide path 68 of the magnetic tape recorder in the direction toward takeup core 45. The peripheral speed of the takeup core is a little greater than the speed with which the leader tape 4 advances.

As soon as the leader tape 4 reaches the effective range of the takeup device, i.e., between takeup core 45 and guide bar 48, it is gripped, as already described, and wound onto the takeup core.

When the leader tape interrupts the light barrier 69–69', sensor 69 produces a signal which, after the 0.5 second delay produced by element 71, actuates switches S11 and S12 at a time when the leader tape is already safely wound onto the takeup core 45. The magnetic tape recorder is thus automatically switched to "forward" for the recording or playback process. Actuating switch S11 causes the pulling magnet 57 to be switched off and, because switch S21 is already closed, connects pulling magnet 66. As a result, the guide bars 48 and 49 are pivoted away from takeup core 45 and the pressure roller 64 is pivoted against capstan 62. Actuating switch S12 switches the left-hand winding motor 43 via resistor 84 and switch S24, to tend to rotate clockwise, i.e., to apply a braking tension to tape 5.

Depressing the STOP key terminates the "forward" operational state in that switches S21 to S25 are brought into their rest position via switching stage 77. The winding motors 43 and 44 are switched off and pressure roller 64 is allowed to retract. With renewed depression of the START key, the "forward" operational state is established again.

If, after actuation of the STOP key, the REWIND key is depressed, the left-hand winding motor 43 is switched to be connected directly across the a.c. power source, via switch S32, to rotate in the clockwise direction with high torque, to rewind the tape, and the right-hand winding motor 44 is switched to be connected to the power source via switch 31 and resistor 85 to apply a braking force sufficient to tension the tape without preventing its rewinding. The magnetic tape 5 is rewound onto reel 1, the leader tape 4 being finally wound onto the peripheral edges 3 of the reel flanges 1'. Depression of the STOP key then terminates the "rewind" operational state and the tape recorder is again in the ready position. The termination of the rewind process could of course also occur automatically by means of known switching and control means.

As already mentioned, FIGS. 16, 17 and 20 serve to illustrate only the basic principles of the design and operation of a tape recorder suited for the above-described reel. For this reason, no brakes, clutches, tape tension control or the like are mentioned here. Several of the control processes, such as, for example, the initiation of the "stop" operational state, can be realized in practice with other means which are known to those skilled in the art.

Figure 18:
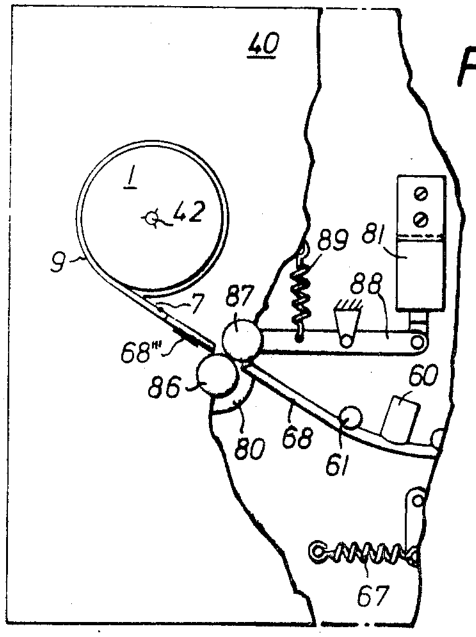
FIG. 18 is a partly cut-away plan view of a portion of a second embodiment of a magnetic tape recorder according to the invention.
Figure 19:
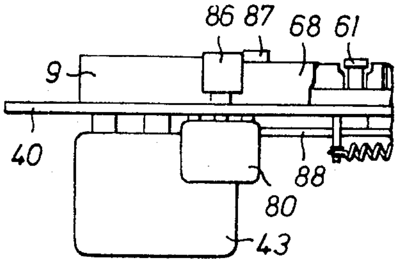
FIG. 19 is a frontal view of the portion shown in FIG. 18.

A further embodiment of a magnetic tape recorder suitable for the described reel is shown in FIGS. 18 and 19. This embodiment contains, between the reel 1 and the takeup device, preferably between the reel and the magnetic head 60, a driven roller 86 which is disposed along the guide path 68 and which cooperates during the starting phase with a counter roller 87. In this embodiment, the roller 86 is disposed on the shaft of its own motor 80, which can be switched on via switches S13 and S26 shown in dashed lines in FIG. 20.

The peripheral speed of roller 86 is greater than the peripheral speed of reel 1 during the starting phase. The counter roller 87 is mounted on a pivot lever 88 which can be actuated against the effect of a tension spring 89 by a pulling magnet 81. The pulling magnet is connected electrically in parallel with the magnet 57 for guide bars 48 and 49, as shown in FIG. 20. Except for the added elements shown, the embodiment of FIGS. 18 and 19 is identical with that of FIGS. 16 and 17.

Upon depression of the START key of the magnetic tape recorder of FIGS. 18 and 19, motor 80 and pulling magnet 81 are switched on and the other operations described in connection with FIGS. 16, 17 and 20 are commenced. The leader tape 4, which has been pushed out of the reel 1 is then gripped and pulled by rollers 86 and 87 and pushed on toward the takeup device 45, 48 and 49.

The magnetic tape recorder of FIGS. 18 and 19 has the advantage that the leader tape 4 need by pushed only over a short distance by the driving force existing between the peripheral edges 3 of the reel flange 1' and the leader tape, i.e., up to rollers 86 and 87.

It is thus sufficient, for example, if the driving force is limited to exist only between the innermost turn of the leader tape and the peripheral edges 3 of flanges 1', as is the case for the embodiments of FIGS. 6–9. The rollers 86 and 87 thus exert a favorable influence on the design of the reel and permit the attainment of high operational dependability even in the case of minimal reel design requirements. In FIGS. 18 and 19, the instrument is provided with a guide surface 9 which forms a continuation of guide path 68.

It will be understood that the above description of the present invention is susceptible to various modifications, changes and adaptations and the same are intended to be comprehended within the meaning and range of equivalents of the appended claims.

I claim:

1. In a reel composed of two facing reel flanges and on which a tape-type record carrier is wound, the trailing end of the carrier being fastened to the reel and its leading end being provided with a stiff, flexible leader tape which is wider than said record carrier and can be wound on peripheral edges of the reel flanges and can be pushed by a takeup force acting in the unwinding direction along a guide path in the direction toward a takeup device, the improvement wherein the peripheral edges against which the leader tape bears are formed as an annular stage, or step, disposed on the inside surface of each respective reel flange, said peripheral edges and the inside surface of their respective reel flanges define a free space which extends from said peripheral edges to the outer edges of the respective reel flanges, and the leader tape comprises a resilient material and is, except for a short leading portion, of such a length and provided with such a curvature that it encloses, and presses against, the peripheral edges under its own tension.

2. An arrangement as defined in claim 1 wherein said reel is closed off by said leader tape to serve directly as a supply container for said record carrier.

3. An arrangement as defined in claim 1 in combination with, and mounted on, a recording and/or playback instrument employing such record carrier and comprising a friction wheel urged, during the start of tape feed, against said leader tape and rotated for driving said leader tape in a direction which unwinds it from said reel.

4. An arrangement as defined in claim 1 in combination with a recording and/or playback instrument employing such record carrier and comprising: means for engaging said reel to rotate it about its axis; means connected to said engaging means for rotating said reel in the tape unwinding direction when said leader tape is wound on said reel; and means on the surface of said peripheral flange edges for applying to said leader tape a driving force effective to move said tape leader in the tape unwinding direction when said reel is rotated in such direction.

5. An arrangement as defined in claim 1 wherein the rear edge of said leader tape adjacent said carrier extends substantially normally to the length of said leader tape, and said peripheral flange edges against which said leader tape bears are provided with a series of circumferentially spaced transverse recesses against which the rear edge of said leader tape engages during the starting phase of the feeding of tape from said reel.

6. An arrangement as defined in claim 4 wherein said instrument further comprises: means defining a guide surface surrounding, and concentric with, said reel; and means defining a guide path forming a continuation of said guide surface and arranged to guide said tape leader away from said reel when said reel is rotated in the tape unwinding direction.

7. An arrangement as defined in claim 4 wherein said instrument further comprises at least one pressure element mounted for urging said leader tape against said peripheral flange edges at least during the start of tape feeding.

8. An arrangement as defined in claim 7, further comprising a coating having a high coefficient of friction on said peripheral flange edges.

9. An arrangement as defined in claim 8, further comprising a coating having a high coefficient of friction disposed on said leader tape on a central region between its lateral edges.

10. An arrangement as defined in claim 7 wherein said leader tape is provided with transverse grooves on both of its wide surfaces.

11. An arrangement as defined in claim 10 wherein said peripheral flange edges against which said leader tape bears are provided with transverse recesses which cooperate with the transverse grooves of the turn of said leader tape contacting said peripheral flange edges.

12. An arrangement as defined in claim 4 wherein said instrument further comprises: a roller disposed adjacent said guide path; a counter roller; means for selectively moving said counter roller against said roller; and means for rotating said roller and counter roller in a direction to grip the leader tape and feed it toward a takeup device.

13. An arrangement as defined in claim 4 wherein said instrument further includes a takeup device comprising, in combination: a takeup core; at least one guide bar shaped to conform to the peripheral surface of said takeup core; and means supporting said bar for movement into a position in which said bar is closely adjacent such peripheral surface and guides the leader tape against such peripheral surface.

* * * * *